US010491079B2

(12) United States Patent
Jugovic et al.

(10) Patent No.: US 10,491,079 B2
(45) Date of Patent: Nov. 26, 2019

(54) ROTARY ELECTRICAL MACHINE WITH IMPROVED POWER ELECTRONICS

(71) Applicant: VALEO EQUIPEMENTS ELECTRIQUES MOTEUR, Creteil (FR)

(72) Inventors: Svetislav Jugovic, Athis-Mons (FR); Fabrice Tauvron, Creteil (FR); Farouk Boudjemai, Marcoussis (FR); Pierre-François Ragaine, Saints (FR); Laurent De Lamarre, Paris (FR); Hugues Tempez, Conteville les Boulogne (FR)

(73) Assignee: Valeo Equipements Electriques Moteur, Creteil (FR)

( * ) Notice: Subject to any disclaimer, the term of this patent is extended or adjusted under 35 U.S.C. 154(b) by 321 days.

(21) Appl. No.: 15/605,504

(22) Filed: May 25, 2017

(65) Prior Publication Data

US 2017/0358973 A1    Dec. 14, 2017

(30) Foreign Application Priority Data

Jun. 14, 2016 (FR) ..................... 16 55517

(51) Int. Cl.
*H02K 9/22* (2006.01)
*H02K 11/33* (2016.01)
*H02K 5/22* (2006.01)
*H01R 13/66* (2006.01)
*H01R 39/38* (2006.01)
*H02K 5/18* (2006.01)

(52) U.S. Cl.
CPC ............. *H02K 9/22* (2013.01); *H01R 13/665* (2013.01); *H01R 39/38* (2013.01); *H02K 5/18* (2013.01); *H02K 5/225* (2013.01); *H02K 11/33* (2016.01)

(58) Field of Classification Search
CPC ...... H02K 11/048; H02K 11/04; H02K 11/05; H02K 11/33; H02K 5/22; H02K 5/225; H02K 9/22
See application file for complete search history.

(56) References Cited

U.S. PATENT DOCUMENTS

| 3,553,505 A | 1/1971 | Sato |
| 8,253,287 B2* | 8/2012 | Isoda ............ H02K 5/225 310/64 |
| 2009/0032320 A1* | 2/2009 | Ward ............ B60L 3/003 180/65.8 |

(Continued)

FOREIGN PATENT DOCUMENTS

| FR | 2950753 A1 | 4/2011 |
| FR | 2967845 A1 | 5/2012 |

*Primary Examiner* — Jeremy A Luks
(74) *Attorney, Agent, or Firm* — Berenato & White, LLC

(57) ABSTRACT

The invention relates mainly to a rotary electrical machine for a motor vehicle, comprising:
  a heat dissipater (65);
  two power modules (50) integrated in the heat dissipater (65), each comprising rectifier elements (53) which form three rectifier bridge arms (52), connection terminals (58) associated with the rectifier bridge arms (52), and a control unit which can control the rectifier bridge arms; and
  a connector (61) which establishes electrical connections, in particular between the terminals (58) for connection of the power modules (50) and the phase outputs of the rotary electrical machine.

18 Claims, 6 Drawing Sheets

(56) References Cited

U.S. PATENT DOCUMENTS

| | | | |
|---|---|---|---|
| 2014/0009016 A1* | 1/2014 | Seidenbinder | H01L 25/16 310/64 |
| 2014/0021814 A1* | 1/2014 | Seidenbinder | H02K 11/048 310/71 |
| 2014/0091682 A1 | 4/2014 | Utsumi et al. | |
| 2014/0375153 A1* | 12/2014 | Suzuki | H02K 11/048 310/54 |
| 2017/0163130 A1* | 6/2017 | Tramet | H02K 11/33 |
| 2017/0317557 A1* | 11/2017 | Inamura | H02K 11/33 |

* cited by examiner

ROTARY ELECTRICAL MACHINE WITH IMPROVED POWER ELECTRONICS

CROSS-REFERENCE TO RELATED APPLICATIONS AND CLAIM TO PRIORITY

This application is related to Patent Application No. 1655517 filed Jun. 14, 2016 in France, the disclosure of which is incorporated herein by reference and to which priority is claimed.

FIELD OF THE INVENTION

The present invention relates to a rotary electrical machine with improved power electronics. The invention has a particularly advantageous, but not exclusive, application in the field of alternators for motor vehicles. An alternator of this type transforms mechanical energy into electrical energy, and can be reversible.

BACKGROUND OF THE INVENTION

A reversible alternator of this type, known as an alternator-starter, makes it possible to transform electrical energy into mechanical energy, in particular in order to start the thermal engine of the vehicle.

In a known manner, an alternator comprises a housing, and inside the housing, a claw rotor which is integral in rotation with a shaft, and a stator which surrounds the rotor with the presence of an air gap.

The rotor comprises two magnet wheels each with a flange with transverse orientation, provided on its outer periphery with claws with axial orientation. The claws of the magnet wheels are imbricated relative to one another. A cylindrical core is interposed axially between the flanges of the wheels. This core supports on its outer periphery an excitation coil formed around an insulating element which is interposed radially between the core and the coil.

In addition, the stator comprises a body constituted by a stack of thin plates forming a crown, the inner face of which is provided with notches which are open towards the interior in order to receive phase windings. These windings pass through the notches in the stator body, and form chignons which project on both sides of the stator body. The phase windings are obtained for example from a continuous wire covered with enamel, or from conductive elements in the form of pins which are connected to one another by welding.

The phase windings are connected electrically to electronic power modules via their phase output. These power modules form a voltage rectifier bridge. Generally each power module comprises a control unit which can control two bridge arms each comprising two rectifier elements which are constituted for example by transistors of the MOSFET type. The bridge arms are controlled in particular according to the temperature of the stator, the position and speed of the rotor, and operating parameters of the thermal engine which are returned by the engine computer.

For a stator which has two three-phase systems, i.e. six phases altogether, the present configurations make it necessary to use three power modules, thus constituting a bulky assembly which does not make it possible to adapt to electrical machines with a reduced diameter, or to incorporate easily new functions required by the motor vehicle manufacturers, such as, for example, a recuperative braking function, or assistance in stopping the thermal engine within the context of a system of the stop and start type (i.e. a system for automatic stopping and restarting of the engine).

SUMMARY OF THE INVENTION

The objective of the invention is to eliminate these disadvantages efficiently by proposing a rotary electrical machine for a motor vehicle, characterised in that it comprises:
a heat dissipater;
two power modules integrated in the heat dissipater, each comprising rectifier elements which form three rectifier bridge arms, connection terminals associated with the rectifier bridge arms, and a control unit which can control the rectifier bridge arms; and
a connector which establishes electrical connections, in particular between the terminals for connection of the power modules and the phase outputs of the rotary electrical machine.

The rotary electrical machine thus comprises two single power modules. By this means, the two power modules can control all the phases of a stator winding of the rotary electrical machine. This has an economic advantage, since it makes it possible to eliminate one power module. In addition, the interconnection of the power modules with the control electronics is easier since there are only two power modules, which facilitates the implementation of functions of the recuperative braking type or assistance in stopping the thermal engine. Moreover, this can also make it possible to reduce the size of the heat dissipater and the connector.

According to one embodiment, the power modules are positioned in corresponding receptacles provided in the heat dissipater.

According to one embodiment, a layer of adhesive is interposed between the power modules and a base of each corresponding receptacle.

According to one embodiment, each power module comprises a control unit and three bridge arms, each being formed by two rectifier elements.

According to one embodiment, the rectifier elements are MOSFET transistors.

According to a variant embodiment, each power module can comprise diodes which can rectify the current of the phases of the stator winding.

According to one embodiment, the connector comprises a body made of electrically insulating material, and an assembly of conductive tracks supported by the said body. The conductive tracks are in particular over-moulded on at least part of the body. According to this embodiment, the connector also comprises connection areas formed by portions of the open conductive tracks. Open means the fact that these portions of the conductive tracks are not over-moulded on the body. The areas of connection make it possible to connect the connection terminals of the power modules to the phase outputs. The connector also makes it possible to form the interconnection between the power modules.

According to one embodiment, the said rotary electrical machine additionally comprises a regulation module in order to regulate a voltage applied to a rotor winding, the said regulation module being integrated in the heat dissipater. The space cleared on the dissipater permits installation of a module for regulation of the rotor winding voltage on the dissipater. This therefore provides a compact assembly suitable for implantation on machines with a small diameter.

According to one embodiment, the regulation module comprises connection terminals which are welded on connection areas of the connector. This permits supply of power to the regulation module and its interconnection with the power modules.

According to one embodiment, the regulation module is positioned in a corresponding receptacle provided in the heat dissipater.

According to one embodiment, a layer of adhesive is interposed between the regulation module and the heat dissipater. For example, the layer of adhesive is interposed between the regulation module and a base of the corresponding receptacle.

According to one embodiment, the machine also comprises a regulation module in order to regulate a voltage applied to a rotor winding, the regulation module being integrated in the connector. This makes it possible to facilitate the interconnection of the different modules with the control electronics, thus facilitating implementation of the functions of the recuperative braking type or assistance in stopping the thermal engine.

According to one embodiment, the connector comprises a cavity for receipt of the regulation module. In this embodiment, receipt pins which are situated in the extension of tracks of the connector open into the cavity in order to ensure interconnection with the regulation module.

According to one embodiment, electrical conductors are positioned between the receipt pins and the components of the regulation module. This makes possible both the power supply to the regulation module, and the interconnection with the power modules.

According to one embodiment, the connector comprises a plastic portion over-moulded on the edges of a plate made of a thermally conductive material. A plate of this type makes it possible to improve the discharge of heat.

According to one embodiment, the plate forms a base of the cavity.

According to one embodiment, a layer of thermally conductive material is interposed between the plate and an inner face of the heat dissipater of the said rotary electrical machine. This also makes it possible to facilitate the discharge of the heat.

According to one embodiment, the plate is centred in the base of the cavity. According to one embodiment, the receipt pins are arranged around the plate.

According to one embodiment, a layer of adhesive is interposed between the regulation module and the connector. According to one embodiment, the layer of adhesive is interposed between the regulation module and the base of the cavity.

According to one embodiment, the heat dissipater comprises a set-back with a form which is complementary to the regulation module.

According to one embodiment, the connector and the heat dissipater have a closed periphery delimiting an opening. This makes it possible to rigidify the connector-heat dissipater assembly.

According to one embodiment, the connector comprises two assemblies of connection lugs in order to ensure a connection with phase outputs, with the two assemblies extending according to two angular sectors which are distinct from one another.

According to one embodiment, each assembly of connection lugs extends opposite a corresponding power module.

According to one embodiment, the two assemblies of connection lugs are spaced from one another angularly by an angle of 120°.

According to one embodiment, the connector comprises an assembly of connection lugs which extends according to the same angular sector, in order to ensure a connection with phase outputs.

According to one embodiment, the connection lugs are positioned between the two power modules.

According to one embodiment, the said rotary electrical machine comprises an added-on brush-holder which is secured on the connector by screwing of a connection interface.

According to one embodiment, the connector is secured on the heat dissipater by means of screws establishing a connection with a positive terminal.

According to one embodiment, the assembly formed by the connector and the heat dissipater is secured on a bearing of the electrical machine by means of screws establishing a connection between the tracks of the connector and an earth of the rotary electrical machine.

According to one embodiment, the connection terminals of the power modules are welded on corresponding connection areas of the connector.

According to one embodiment, each receptacle is filled with a protective layer.

BRIEF DESCRIPTION OF THE DRAWINGS

The invention will be better understood by reading the following description and examining the figures which accompany it. These figures are provided purely by way of illustration and in no way limit the invention.

Elements which are identical, similar or analogous retain the same reference from one figure to another.

DETAILED DESCRIPTION OF THE PREFERRED EMBODIMENT(S)

Figures 1, 2:
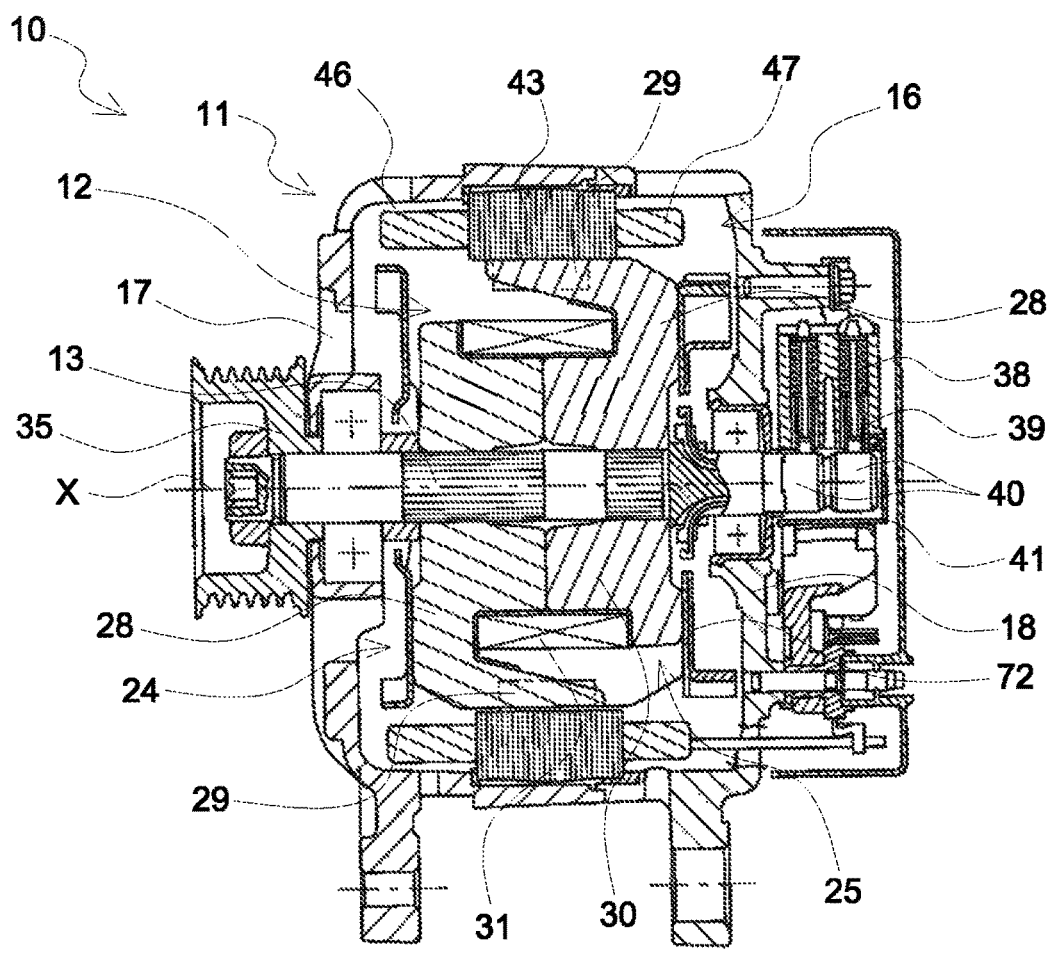
FIG. 1 is a view in longitudinal cross-section of an alternator according to an example of the present invention.
FIG. 2 is a view in perspective showing the rear end of the alternator according to the example in FIG. 1.

FIG. 1 represents a compact polyphase alternator 10, in particular for a motor vehicle. The alternator 10 can transform mechanical energy into electrical energy, and can be reversible. A reversible alternator of this type, known as an alternator-starter, makes it possible to transform electrical energy into mechanical energy, in particular in order to start the thermal engine of the vehicle.

This alternator 10 comprises a housing 11, and inside the housing, a claw rotor 12 fitted on a shaft 13, and a stator 16, which surrounds the rotor 12 with the presence of an air gap between the outer periphery of the rotor 12 and the inner periphery of the stator 16. The axis X according to which the shaft 13 extends forms the axis of rotation of the rotor 12.

The housing 11 comprises front 17 and rear 18 bearings which support the stator 16. The bearings 17, 18 have a hollow form, and each support centrally a ball bearing for fitting of the shaft 13 with rotation.

More specifically, the rotor 12 comprises two magnet wheels 24, 25 which each have a flange 28 with transverse orientation provided on its outer periphery with claws 29, which for example have a trapezoidal form and axial orientation. The claws 29 of one wheel 24, 25 face axially towards the flange 28 of the other wheel. The claws 29 of one magnet wheel 24, 25 penetrate into an inter-tooth space which exists between two adjacent claws 29 of the other magnet wheel, such that the claws 29 of the magnet wheels 24, 25 are imbricated relative to one another.

A cylindrical core 30 is interposed axially between the flanges 28 of the wheels 24, 25. In this case, the core 30 consists of two half-cores which each belong to one of the flanges 28. This core 30 supports an excitation rotor winding 31 on its outer periphery.

The shaft 13 can be forced into the central bore in the magnet wheels 24, 25. On its front end side, the shaft 13 can comprise a threaded part for securing of a pulley 35. The pulley 35 belongs to a device for transmission of movement to at least one belt between the alternator 10 and the thermal engine of the motor vehicle.

The rear bearing 18 supports a brush-holder 38 provided with brushes 39 which are designed to rub against rings 40 of a collector 41, in order to ensure the supply of power to the rotor 12 winding. More specifically, the brush-holder 38 comprises a casing with receptacles which are each designed to receive a brush. In addition, an added-on protective element 42 which can be seen in FIG. 2 can be secured for example by snapping, via a slide connection, on the end side of the brushes 39 which are designed to rub against the rings 40. This protective element 42 which is positioned around the brushes 39 and the corresponding rings 40 makes it possible to ensure the protection of the assembly relative to the external environment.

In addition, the stator 16 comprises a body 43 in the form of a set of plates provided with notches equipped with a notch insulator for fitting of the phases of the stator 16. Each phase comprises at least one phase winding which passes through the notches in the body of the stator 43, and forms together with all the phases a front chignon 46 and a rear chignon 47 on both sides of the stator body of the 43.

The phase windings are obtained for example from a continuous wire covered with enamel, or from conductive elements in the form of pins which are connected electrically to one another, for example by welding. The phase windings are connected electrically to electronic power modules 50 via their phase output. These power modules 50 form a voltage rectifier bridge, in order to transform the alternating voltage generated by the alternator 10 into a direct voltage, in order in particular to supply power to the battery and the on-board network of the vehicle.

Figure 4:
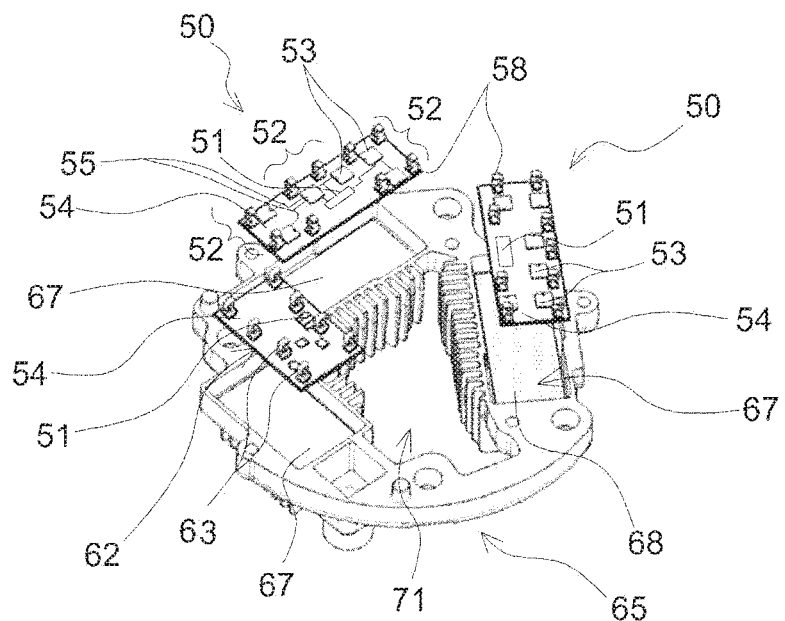
FIG. 4 is an exploded view in perspective of the electronic power and regulation modules, and of the heat dissipater of the alternator according to the embodiment in FIG. 3.

More specifically, as can be seen in FIG. 4, the rotary electrical machine comprises two power modules 50. Each power module 50 comprises a control unit 51, which can control three bridge arms 52 each comprising two rectifier elements 53. The rectifier elements 53 are for example constituted by transistors of the MOSFET type.

Thus, in the example of a rotary electrical machine which has a double three-phase winding, each power module controls three phases of the stator 16.

According to a variant embodiment, each power module can comprise a plurality of diodes.

These components 51, 52, 53, as well as other passive components (in particular resistors and capacitors) are implanted on an electronic board 54 comprising tracks 55 provided in a layer of conductive material, in particular a layer of copper. The layer of copper covers for example a layer of ceramic, which also supports a second layer of copper on the side opposite the face of the board 54 which supports the electronic components. In this example, the different components are implanted on the board 54 by means of brazing.

The components are connected electrically to the tracks 55 of the electronic board 54 for example by means of a wire bonding process. Connection terminals 58 are associated with the different power modules 50, for the interconnection with the tracks 60 of a connector 61 described in greater detail hereinafter.

The electrical machine 10 also comprises a regulation module 62 in order to regulate a voltage applied to a rotor winding. This regulation module 62 comprises a control unit 51 and associated electronic components.

For example, the control unit 51, as well as the associated electronic components of the regulation module 62 are implanted on an electronic board 54 comprising tracks 55 which are provided in a layer of conductive material, in particular a layer of copper.

Figure 3:
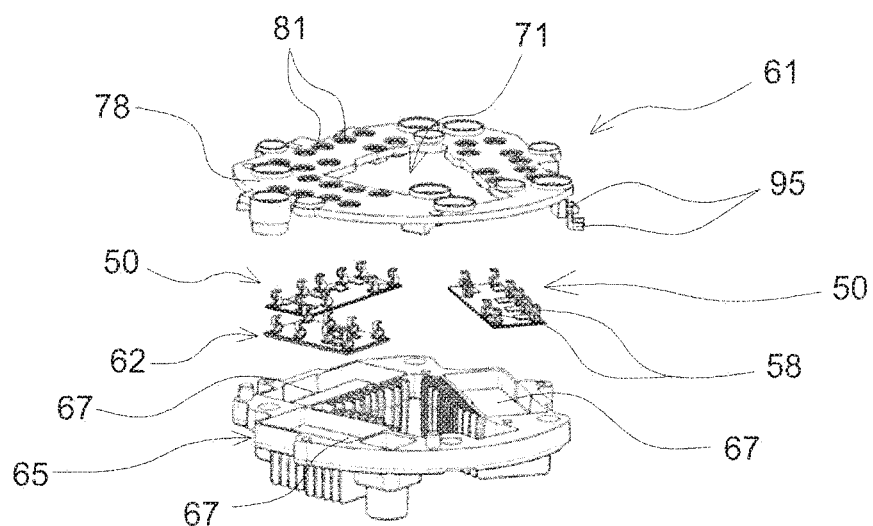
FIG. 3 is an exploded view in perspective of the connector, of the electronic power modules, of the regulation module, and of the heat dissipater of the alternator according to an example of a first embodiment.
Figure 5:
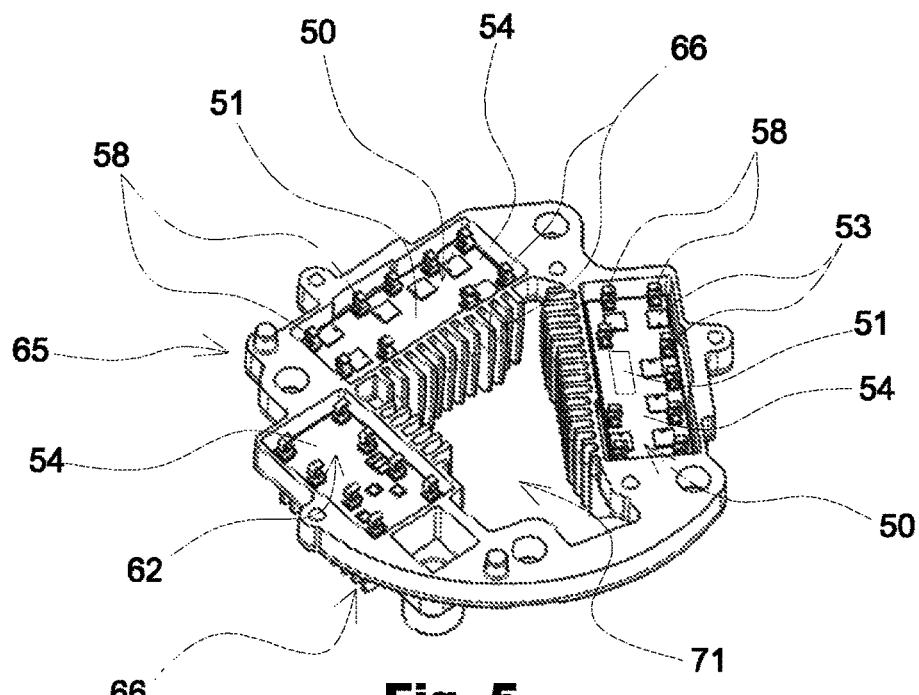
FIG. 5 is a view in perspective of the electronic power and regulation modules installed in corresponding receptacles of the heat dissipater of the alternator according to the embodiment in FIG. 3.

According to a first embodiment, as can be seen in FIGS. 3, 4, and 5, the power modules 50 as well as the regulation module 62 are integrated in (i.e., non-moveably secured to) a heat dissipater 65, i.e. they are each positioned inside a corresponding receptacle 67 provided in the heat dissipater 65.

Preferably, in order to improve the discharge of the heat diffused by the different modules 50 and 62, a layer of thermally conductive adhesive 68 is interposed between the power modules 50 and a base of each corresponding receptacle 67, as well as between the regulation module 62 and a corresponding base of the receptacle 67. Preferably, the layer of adhesive 68 is deposited between the face of the board which does not support any component and the base of the receptacle 67. The adhesive also permits securing of the different modules 50, 62 in the receptacles 67.

Each receptacle 67 can be filled with a protective layer such as gel or resin, in order to protect the electronic components against the external environment. As a variant, each receptacle 67 can be closed by a respective cover.

Advantageously, the heat dissipater 65 comprises a plurality of fins 66 which extend projecting from the outer face of the body of the dissipater 65. "Outer face" designates face of the dissipater opposite the inner face of the said dissipater which faces the stator.

Figure 7:
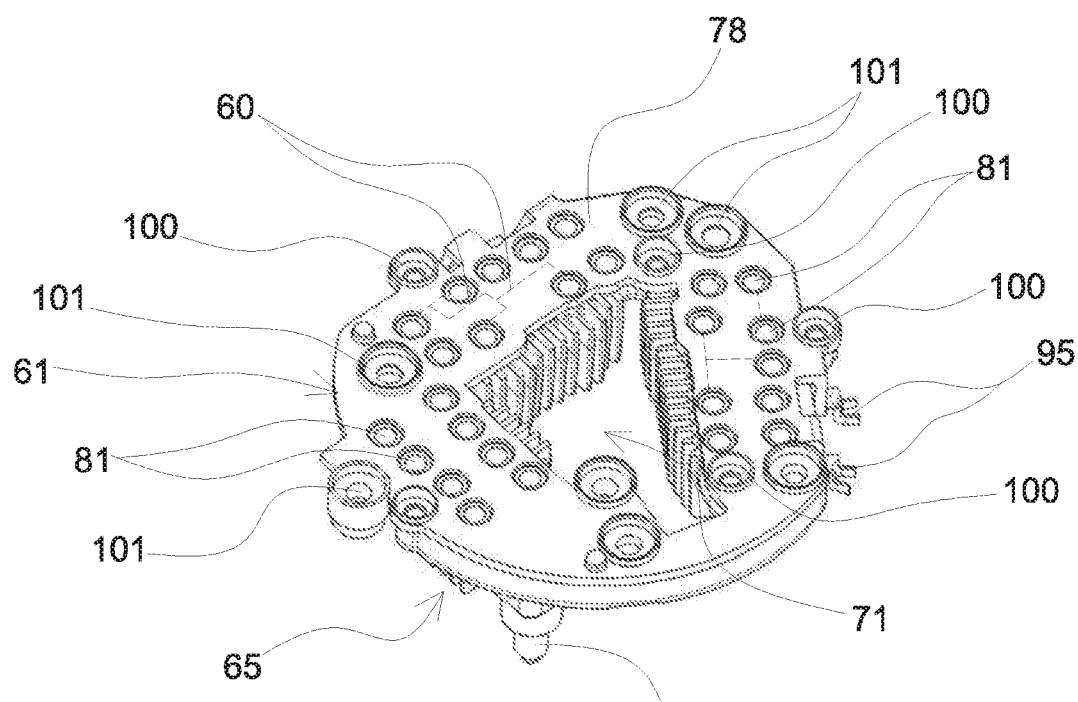
FIG. 7 is a view in perspective from below of the sub-assembly formed by the heat dissipater and the connector of the alternator according to the embodiment in FIG. 3.

The connector 61 and the heat dissipater 65 preferably have a closed periphery delimiting an opening 71 which can be seen in particular in FIGS. 5 and 7. This makes it possible to facilitate the integration of the brush-holder 38, as well as the circulation of air inside the alternator 10. For this purpose, the alternator 10 comprises vanes 72 which are fitted integrally in rotation on the axial ends of the rotor 12, as shown in FIG. 1.

The connector 61 establishes electrical connections in particular between the terminals 58 of the power modules 50 and the phase outputs of the alternator 10. The connector 61 also establishes electrical connections between the components of the electronic boards 54 and the positive potential, via a positive terminal B+ with the reference 75. The positive terminal 75 is for example arranged on the heat dissipater 65. In addition, the connector 61 also establishes electrical connections between the components of the electronic boards 54 and an earth of the vehicle, in particular via the rear bearing 18 or the heat dissipater 65.

For this purpose, as illustrated in FIG. 7, the connector 61 comprises a body 78 in the general form of a plate made of insulating material, over-moulded on an assembly of conductive tracks 60, some of which are represented in broken lines. The connections between the terminals 58 of the power modules 50 and the tracks 60 are formed for example by means of laser welding through the connection areas 81. Each connection area 81 is formed by a portion of conductive track 60 which is not over-moulded by the body 78. The regulation module 62 also comprises projecting terminals 63 which are welded on corresponding connection areas 81 of the connector 61.

Figure 6:
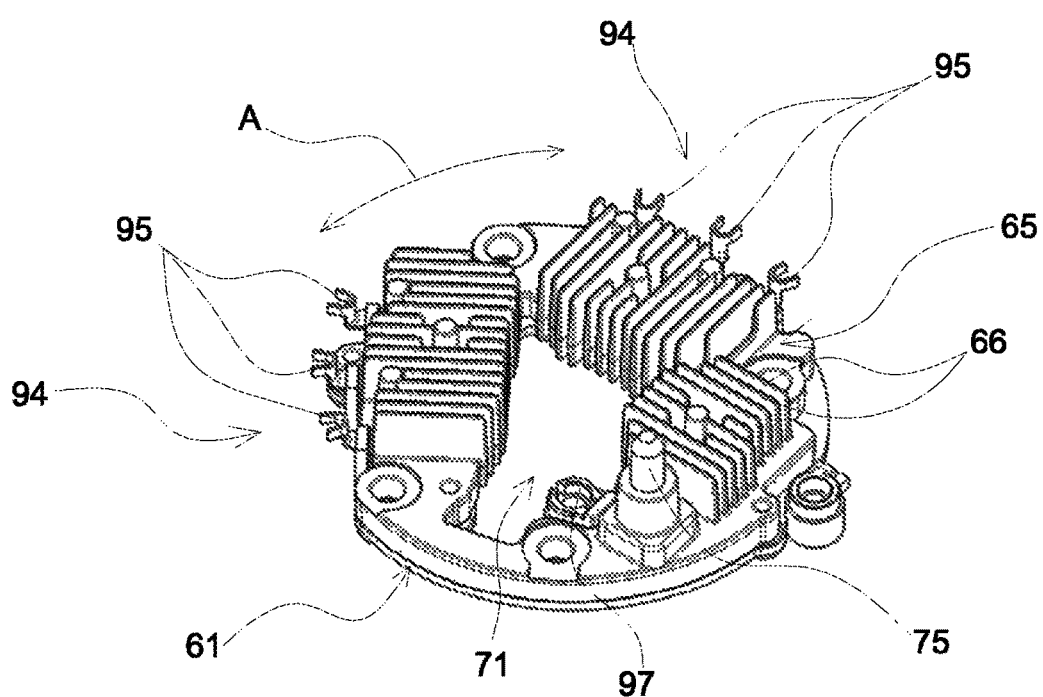
FIG. 6 is a view in perspective from above of the sub-assembly formed by the heat dissipater and the connector of the alternator according to the embodiment in FIG. 3.
Figure 8:
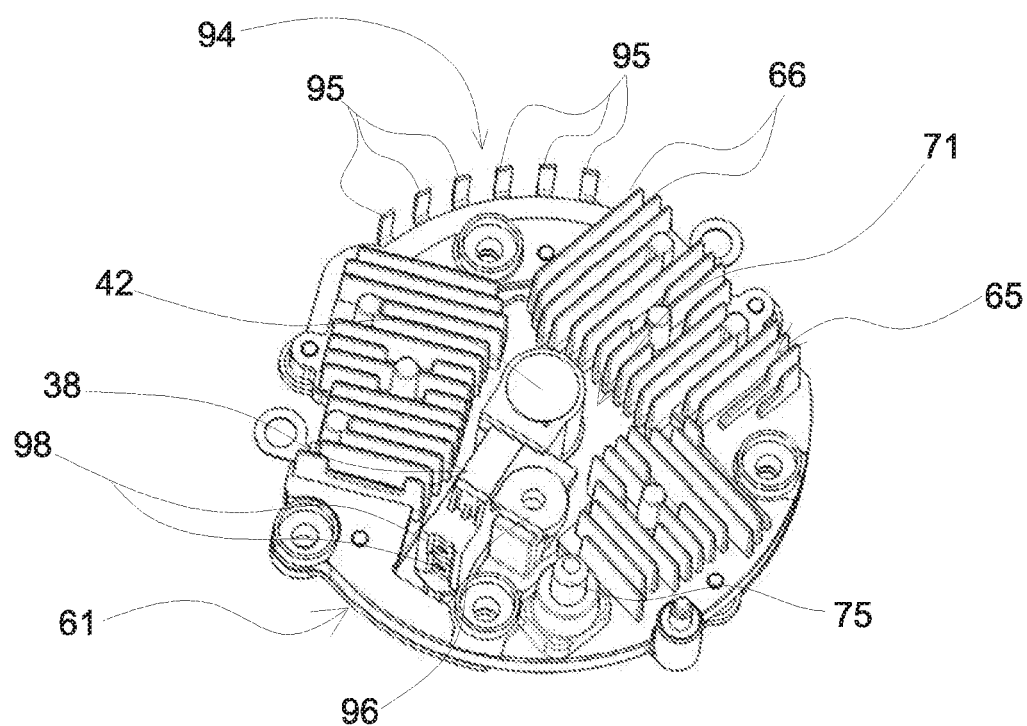
FIG. 8 is a view in perspective illustrating a variant of the positioning of the phase outputs of the stator winding of the alternator according to the present invention.

As shown in FIGS. 2, 6 and 8, some tracks 60 project radially towards the exterior of the body 78 of the connector, whilst being arranged at their free ends in the form of connection lugs 95, in order to establish the connection with the phase outputs of the stator winding.

In the embodiment in FIGS. 2 and 6 representing a double three-phase machine, the connector 61 comprises two assemblies 94 of three connection lugs 95 which are designed to be connected to phase outputs. The two assemblies 94 extend according to two angular sectors which are distinct from one another. It will be noted that an angular sector is defined by an angular area according to which the connection lugs 95 (and thus the phase outputs of the stator winding) are spaced from one another by an angular interval which is substantially identical.

Each assembly 94 of connection lugs 95 extends opposite a corresponding power module 50. According to one embodiment, the two assemblies 94 of connection lugs 95 are spaced angularly from one another by an angle A of approximately 120°.

In the embodiment in FIG. 8 also representing a double three-phase machine, the connector 61 comprises an assembly 94 of connection lugs 95 which extend according to the same angular sector. The connection lugs 95 can then be positioned between the two power modules 50.

The added-on brush-holder 38 can be secured on the connector 61 by screwing of a connection interface 96. This connection interface 96 ensures the connection of the brush-holder 38 to the connector 61, in order to supply power to the brushes 39.

For this purpose, two supply tracks make it possible to supply with power the brushes 39 which extend from the connection interface 96 as far as areas of welding 98 with the braids of the brushes. On the side of their end which is situated at the connection interface 96, the supply tracks can have the form of a half-moon, for interconnection with corresponding forms 97 of the connector 61 shown in FIG. 6.

The connector 61 is secured on the heat dissipater 65 for example by means of screws. The securing of the connector 61 on the heat dissipater 65 makes it possible to establish a connection of the connector 61 to the positive terminal B+ 75. For this purpose, the screws pass through corresponding openings in the connector 61 with the reference 100 in FIG. 7.

The sub-assembly formed by the connector 61 and the heat dissipater 65 is secured on the rear bearing of the electrical machine, for example by means of screws, thus establishing a connection between the tracks of the connector 61 and an earth of the rotary electrical machine. For this purpose, the screws pass through corresponding openings in the connector 61 with the reference 101. Insulating shanks positioned around the screws can be provided in order to prevent any short-circuits.

Figure 9:
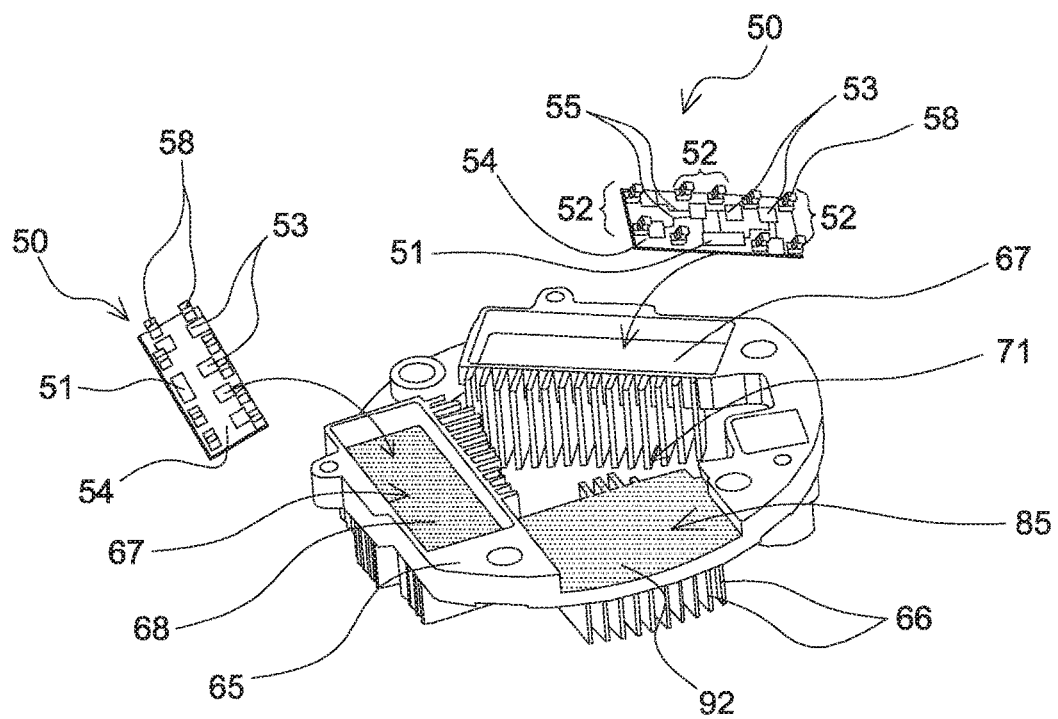
FIG. 9 is an exploded view in perspective of the electronic power modules and of the heat dissipater of the alternator according to an example of a second embodiment.
Figure 10:
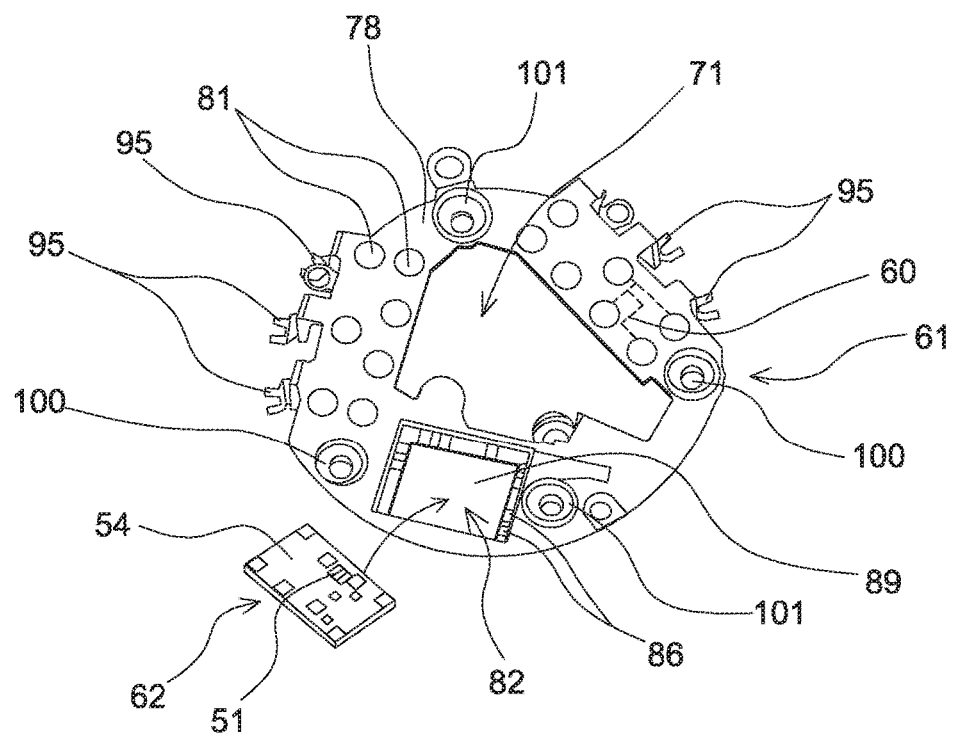
FIGS. 10 and 11 are views in perspective from below and from above of the connector of the alternator according to the embodiment in FIG. 9.
Figure 11:
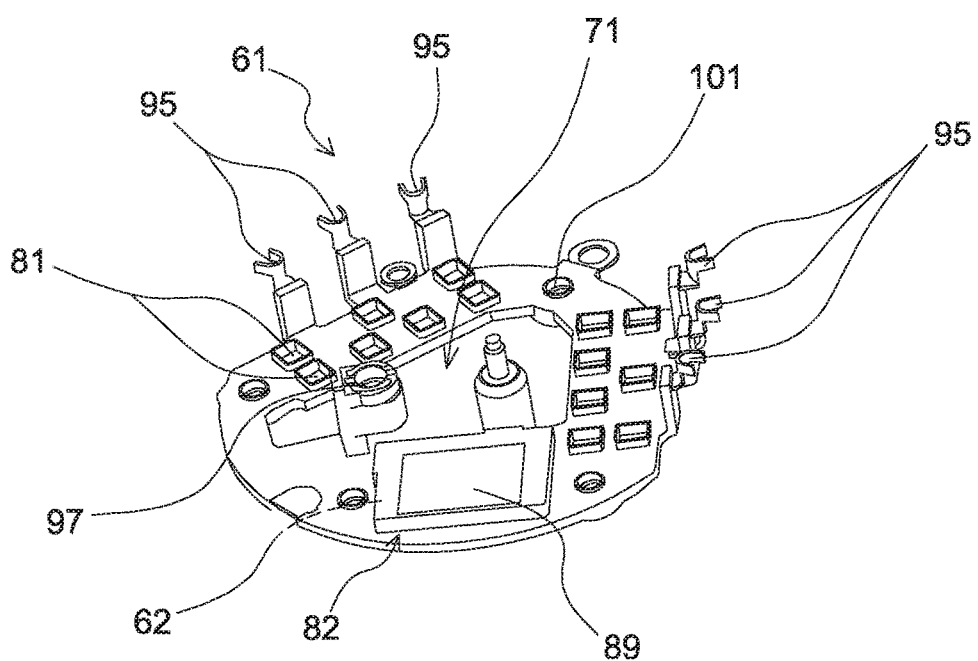

According to a second embodiment represented in FIGS. 9, 10 and 11, the regulation module 62 is integrated in (i.e., non-moveably secured to) the connector 61. For this purpose, the connector 61 comprises a cavity 82 for receipt of the regulation module 62. In order to facilitate the assembly between the heat dissipater 65 and the connector 61, the heat dissipater 65 comprises a set-back 85 on its inner face, as shown in FIG. 9. "Inner face" designates the face of the dissipater which is opposite the stator. This set-back 85 has a form which is complementary with the regulation module 62, or more specifically with the projecting walls of the connector 61 which delimits the cavity 82. According to one embodiment, the cavity 82 can be filled with a protective layer such as gel or resin, in order to protect the electronic components against the external environment. As a variant, the cavity 82 can be closed by a cover.

As can be seen in FIG. 10, receipt pins 86 situated in the extension of the tracks 60 of the connector 61 open into the cavity 82, in order to ensure interconnection with the regulation module 62. The components of the regulation module 62 are connected electrically to the receipt pins 86 for example by means of a wire bonding process. Thus, electrical conductors are positioned between the receipt pins 86 and the components of the regulation module, permitting both supply of power to the regulation module 62, and interconnection with the power modules 50.

The body of the connector 78 comprises a plastic portion which is over-moulded on the edges of a plate 89 made of a thermally conductive material forming the base of the cavity 82. The body of the connector 78 thus delimits a window around the plate 89. For example, the plate 89 is centred in the base of the cavity 82. Again as an example, the receipt pins 86 are arranged around the plate.

According to one embodiment, a layer of thermally conductive material 92 is interposed between the plate 89 and an inner face of the heat dissipater 65, in particular a face of the set-back 85, as shown in FIG. 9.

In this second embodiment, only the regulation module is arranged differently. The other characteristics and elements of the invention are identical, or substantially identical, to those described in the description of the first embodiment.

It will be appreciated that the foregoing description has been provided purely by way of example, and does not limit the field of the invention, a departure from which would not be constituted by replacing the different elements by any other equivalents.

In addition, the different characteristics, variants, and/or embodiments of the present invention can be associated with one another according to various combinations, provided that they are not incompatible or mutually exclusive.

The invention claimed is:

1. A rotary electrical machine (10) for a motor vehicle, the rotary electrical machine (10) comprising:
   a heat dissipater (65);

two power modules (50) integrated in the heat dissipater (65), each power module comprising rectifier elements (53) forming three rectifier bridge arms (52), connection terminals (58) associated with the rectifier bridge arms (52), and a control unit (51) operable to control the rectifier bridge arms (52); and a connector (61) configured to establish electrical connections between the connection terminals (58) for connection of the power modules (50) and phase outputs of the rotary electrical machine (10).

2. The rotary electrical machine according to claim 1, wherein each bridge arm (52) is formed by two of the rectifier elements (53).

3. The rotary electrical machine according to claim 1, further comprising a regulation module (62) configured to regulate a voltage applied to a rotor winding (31), wherein the regulation module is integrated in the heat dissipater (65).

4. The rotary electrical machine according to claim 3, wherein the regulation module (62) comprises projecting terminals (63) welded on connection areas (81) of the connector (61).

5. The rotary electrical machine according to claim 3, wherein the regulation module (62) is positioned in a corresponding receptacle (67) provided in the heat dissipater (65).

6. The rotary electrical machine according to claim 5, wherein a layer of adhesive (68) is interposed between the regulation module (62) and the heat dissipater (65).

7. The rotary electrical machine according to claim 1, further comprising a regulation module (62) configured to regulate a voltage applied to a rotor winding (31), wherein the regulation module (62) is integrated in the connector (61).

8. The rotary electrical machine according to claim 7, wherein the connector (61) comprises a cavity (82) configured to receive the regulation module (62), and wherein receipt pins (86) situated in extension of tracks (60) of the connector (61) open into the cavity (82) in order to ensure interconnection with the regulation module (62).

9. The rotary electrical machine according to claim 1, wherein each of the connector (61) and the heat dissipater has a closed periphery delimiting an opening (71).

10. The rotary electrical machine according to claim 1, wherein the connector (61) comprises two assemblies (94) of connection lugs (95) configured to ensure a connection with the phase outputs, wherein the two assemblies (94) extend according to two angular sectors which are distinct from one another, and wherein each of the two assemblies (94) includes a plurality of the connection lugs (95).

11. The rotary electrical machine according to claim 1, wherein the connector (61) comprises an assembly (94) of connection lugs (95) extending according to the same angular sector in order to ensure a connection with the phase outputs.

12. The rotary electrical machine according to claim 1, further comprising an added-on brush-holder (38) secured on the connector (61) by screwing of a connection interface (96).

13. The rotary electrical machine according to claim 1, wherein the connector (61) is secured on the heat dissipater (65) by means of screws establishing a connection with a positive terminal (75).

14. The rotary electrical machine according to claim 11, wherein the assembly (94) of the connector (61) and the heat dissipater (65) are secured on a bearing (18) of the electrical machine by screws establishing a connection between tracks (60) of the connector (61) and ground of the rotary electrical machine.

15. The rotary electrical machine according to claim 1, wherein the connection terminals (58) of the power modules (50) are welded on corresponding connection areas (81) of the connector (61).

16. The rotary electrical machine according to claim 2, further comprising a regulation module (62) configured to regulate a voltage applied to a rotor winding (31), wherein the regulation module is integrated in the heat dissipater (65).

17. The rotary electrical machine according to claim 4, wherein the regulation module (62) is positioned in a corresponding receptacle (67) provided in the heat dissipater (65).

18. The rotary electrical machine according to claim 2, further comprising a regulation module (62) configured to regulate a voltage applied to a rotor winding (31), wherein the regulation module (62) is integrated in the connector (61).

* * * * *